Patented Nov. 30, 1943

2,335,271

UNITED STATES PATENT OFFICE 2,335,271

IMIDAZOL DERIVATIVES AND PROCESS OF MAKING SAME

Charles Graenacher, Riehen, and Paul Streuli and Jost Frei, Basel, Switzerland, assignors to Society of Chemical Industry in Basle, Basel, Switzerland, a firm No Drawing. Application May 14, 1940, Serial No. 335,136. In Switzerland May 24, 1939

8 Claims. (Cl. 260—309)

It has been found that new derivatives of heterocyclic compounds are obtained when aryl imidazols of the general formula

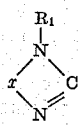

in which $x$ represents an aromatic radical, particularly belonging to the benzene or naphthalane series, which contains at least one sulfonic acid group $R_1$ and $R_2$ represent hydrogen or a substituent, preferably an aliphatic radical, or their sulfonic acid salts are treated with alkylating agents or aralkylating agents in the absence of water and, if required, further alkylating or aralkylating agents, which differ from those already mentioned, or even acylating agents, are allowed to react with the resulting compounds so long as the imidazol compounds obtained by the action of the former alkylating or aralkylating agents contain still further groups which are capable of being alkylated or acylated. The products thus obtained, insofar as they are not already soluble in water, may be converted into the water-soluble salts of the corresponding sulfonic acids by treatment with hydroxides, particularly hydroxides of alkali metals.

Aryl imidazols of the general formula

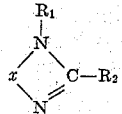

in which $x$, $R_1$ and $R_2$ have the meanings already given, which may be used in this reaction are, for example, benzimidazol and naphthimidazol sulfonic acids, which, for example, are derived from o-phenylene diamine or its homologues or analogues, such as o-toluylene diamine, and also from ortho or 1:8-naphthylene diamines.

Examples of those imidazol compounds in which $R_1$ and $R_2$ in the formula already mentioned represent hydrogen are benzimidazol sulfonic acid and perimidine sulfonic acid.

Aryl imidazols of the general formula

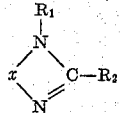

in which $x$ represents a sulfonated aromatic nucleus, $R_1$ represents hydrogen and $R_2$ represents a substituent, that is to say, imidazols of the general formula

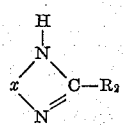

are for example, $\mu$-amino, $\mu$-mercapto-, $\mu$-methoxy-, $\mu$-ethoxy-, $\mu$-methyl-, $\mu$-ethyl-, $\mu$-propyl-, $\mu$-isopropyl-, $\mu$-butyl-, $\mu$-amyl-, $\mu$-heptyl-, $\mu$-undecyl-, $\mu$-pentadecyl-, $\mu$-heptadecenyl- benzimidazol sulfonic acids, or $\mu$-undecylperimidine sulfonic acid. Into consideration come also sulfonated condensation products of aldehydes with aryl imidazols, which are substituted at the $\mu$-carbon atom by a carbon chain (if desired, interrupted by O, S or N) which contains at least 2 carbon atoms and to the $\alpha$-carbon atom of which is attached a methylene group. As these examples show, $R_2$ can be, quite generally, a hydrocarbon radical—substituted if desired—the chain of which may also be interrupted by oxygen, sulfur or nitrogen bridges or by atomic groupings such as

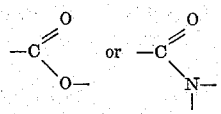

Particularly valuable are those aryl imidazols of the formula mentioned above in which $R_2$ represents an aliphatic hydrocarbon radical, a radical of a substituted aliphatic hydrocarbon or a radical of an aliphatic hydrocarbon, the carbon chain of which is interrupted by hetero atoms—that is, by oxygen, sulfur or nitrogen atoms—or by ester or amide-like bridges. Among those imidazols of the formula mentioned, in which $R_2$ represents an alkyl radical, those products in which $R_2$ stands for an alkyl radical having an odd number of carbon atoms lying between 10 and 20 are particularly readily accessible.

Among aryl imidazols of the general formula

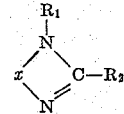

in which $x$ represents a sulfonated aromatic nucleus, $R_2$ represents hydrogen of a substituent, and $R_1$ represents a substituent, for example an aliphatic radical, there may be mentioned, for instance the N-alkylation and N-aralkylation products of the imidazol sulfonic acids mentioned in the previous paragraph. Among them, are for instance, N - benzyl - μ - heptadecylbenzimidazol sulfonic acid, N-dodecyl-μ-propylbenzimidazol sulfonic acid. Quite generally, the substituent $R_1$ may represent a hydrocarbon radical, substituted if desired, the chain of which may be interrupted also by oxygen, sulfur or nitrogen bridges, or by atomic groupings such as

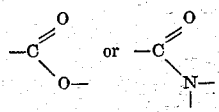

The imidazol sulfonic acids which are to be used as parent substances in the present process are either known or may be prepared directly by analogous processes. They are used preferably in the form of their salts, for example, in the form of their alkali metal salts.

Alkylating and aralkylating agents which are suitable for use in the present process are, for example, alkyl halides, such as methyl or ethyl chloride, halogen hydrine, such as ethylene chlorhydrin, propylene chlorhydrin, butylene chlorhydrin, or α-glycerolmonochlorhydrin, acetals containing reactive halogen atoms, such as formaldehyde-γ-chloropropylene acetal, halogen carboxylic acids and their functional derivatives, such as monochloroacetic acid, α-bromobutyric acid, α-bromolauric acid, chloracetic acid amide, chloracetic acid ethyl ester, chloracetic acid amyl ester, chloracetic acid-(2-ethylbutyl)-ester or α-chlorobuturic acid ethyl ester, alkylene oxides, such as ethylene oxide, propylene oxide, glycide or epichlorhydrin, halogen alkyl sulfonic acids, dialkyl sulfates, such as dimethyl or diethyl sulfate, furthermore, benzyl chloride and the like.

The esters of aliphatic halogen carboxylic acids mentioned as alkylating agents, as well as the halogen hydrins of the type of α-glycerolmonochlorhydrin, and the alkylene oxides named, may be considered as being those alkylating agents which introduce aliphatic radicals containing at least 2 oxygen atoms. Ethylene oxide certainly contains only one oxygen atom, but if two molecules of ethylene oxide be allowed to react according to the present process, a radical of the formula $$-CH_2-CH_2-O-CH_2-CH_2-OH$$

that is to say, an aliphatic radical containing at least 2 oxygen atoms, is introduced. For every further molecule of ethylene oxide used, the chain is extended by the member $-CH_2-CH_2-O-$. To those alkylating agents which introduce an aliphatic radical containing at least 1 oxygen atom belong the halogen carboxylic acid esters, alkylene oxides and α-glycerolmonochlorhydrin already mentioned, as well as the halogen carboxylic acid amides and the ethylene chlorhydrin which have also been mentioned previously.

The alkylene oxides, such as ethylene oxide, propylene oxide, glycide and epichlorhydrin already mentioned, may be considered as alkylating agents which contain a 1:2-epoxy group.

The reaction between the imidazol sulfonic acids or their salts and the alkylating or aralkylating agents takes place in the absence of water and preferably at raised temperature.

The salts of the benzimidazol sulfonic acids which, for example, are to be used as parent materials, may be considered as imidazol derivatives of the general formula

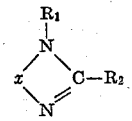

in which $x$ represents a radical of the benzene series which contains a neutralised sulfonic acid group and $R_1$ and $R_2$ have the meaning given above.

The reaction may advantageously take place in organic solvents or diluents, such as alcohol, toluene, xylene. If readily volatile alkylating agents, such as alkylene oxides, are used, it is generally preferable to work under pressure, should it be necessary to carry out the reaction at a raised temperature.

The products obtained, for example from the alkali salts of the imidazol sulfonic acids of the general formula

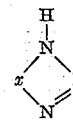

in which $x$ represents a sulfonated aromatic nucleus and $R_2$ stands for a high molecular alkyl radical, with alkylating agents such as halogen hydrins, halogen carboxylic acids and their functional derivatives, are, in general, difficultly soluble in water but yield readily soluble salts on warming with alkali hydroxides.

One method of carrying out the present process consists of allowing two alkylating or aralkylating agents which differ from one another to react upon the imidazol sulfonic acids, so far as the imidazol compounds obtainable with the one alkylating or aralkylating agent contain still further groups which may be alkylated. Thus, those alkylation or aralkylation products which contain at least one hydrogen atom or one alcoholic or phenolic hydroxyl group attached to a nitrogen atom may be treated with alkylene oxides, whereupon products containing hydroxyalkyl groups or polyglycol radicals result. Such an introduction of polyglycol radicals increases the solubility, and particularly the stability towards boiling dilute acids. It is also possible, for example, to treat the alkylation products with those neutral alkyl sulfates which permit the introduction of a second alkyl group which differs from an alkyl group which is already present. The action of the two differing alkylating or aralkylating agents may take place simultaneously or separately. The simultaneous reaction is particularly advantageous if an alkylene oxide be used as alkylating agent.

Another method of carrying out the present process consists of allowing acylating agents to react upon the imidazol sulfonic acids or their sulfonic acid salts which have already been treated with alkylating or aralkylating agents, so long as the alkylated or aralkylated imidazol compound contains groups, for example, hydroxy groups, which are still capable of being acylated. As acylating agents, use may be made, for example, of carboxylic acid anhydrides or halides, such as acetic anhydride or stearic acid chloride. Acylation may take place in known manner, for example, in the presence of acid binding agents.

The constitution of the products obtained by the present invention cannot in all cases be determined with certainty. The new products are therefore best characterised by their process of manufacture. In the form of the alkali salts of the corresponding sulfonic acid, they are viscous to solid products which are soluble in water. The aqueous solutions of those alkali salts of imidazol sulfonic acids which contain an alkyl radical of at least 10 carbon atoms are strongly capillary active.

So far as they are soluble in water and are prepared from suitable parent materials, the reaction products obtained according to the present invention may find application as textile auxiliary products, for example, as wetting, cleaning, washing, emulsifying, dispersing, foaming, softening, and levelling agents. For these purposes, those reaction products of imidazol compounds which contain a high molecular aliphatic or cycloaliphatic radical at the $\mu$-carbon atom or at the N-atom are particularly suitable. Such products can form valuable auxiliaries for the wool dyeing process; in many cases, particularly with dyestuffs which contain metals in complex union the use of suitably chosen products of the present invention will result in the production of deeper and more bloomy dyeings.

The water-soluble products of the present process differ from the comparable parent imidazol compounds in their increased resistance towards acids or in their enhanced dispersing powers in connection with the dispersion of difficultly soluble organic sulfonic acids in an acid solution.

The products obtained according to the present invention may be used alone or in combination with other substances, such as salts—particularly salts of weak acids, such as sodium acetate—solvents, soaps, soap-like substances, protective colloids, finishing, weighting, softening, or matting agents and the like.

By an addition of a larger quantity of a salt, for example by an addition of sodium sulfate the washing capability in an acid bath of the products fast to acid as obtained by the present invention may be improved considerably.

The following examples illustrate the invention, the parts being by weight unless otherwise stated:

Example 1

77 parts of the sodium salt of the sulfonated benzimidazol obtained by condensation of o-phenylene diamine with coconut oil fatty acids and 20 parts of chloroacetamide are introduced with stirring into 500 parts of xylol. The mixture is then boiled for 12 hours under reflux. After the reaction is complete the xylol is removed from the reaction mass by distillation under reduced pressure, and the reaction product remains as a powdery residue.

The product thus obtained is difficultly soluble in water, but gives a clear solution after adding an alkali hydroxide solution and heating for a short time. The solution obtained remains clear even after sufficient acetic acid has been added to give a pronounced acid reaction with litmus. In this the reaction product differs markedly from the parent benzimidazol sulfonate. The new product, which probably possesses the formula

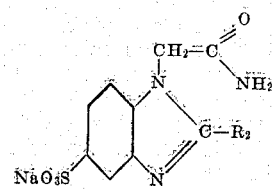

($R_2$=alkyl radicals corresponding to the fatty acids present in coconut oil), is remarkable for its property of being able to form aqueous solutions which foam in an outstanding manner.

Example 2

90 parts of the sodium salt of the sulfonated benzimidazol obtained by condensation of o-phenylene diamine with technical stearic acid and 26 parts of the ethyl ester of monochloracetic acid are introduced into 300 parts of xylol. The reaction is carried out as described in Example 1 and the product of the reaction is then worked up.

A powdery mass results which is difficultly soluble in water. The compound is converted into a readily soluble sodium salt by suspending the reaction mass in three times its weight of water and adding dilute sodium hydroxide solution while heating, until the solution continues to react alkaline to phenolphthalein.

A clear solution is obtained, which is then neutralized with dilute sulfuric acid and evaporated. The sodium salt of the new acid, which probably has the formula

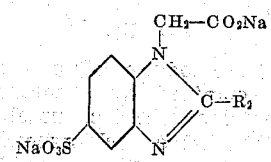

($R_2$=pentadecyl and heptadecyl radicals), is obtained as a light colored powder which dissolves readily in water to form a strongly foaming solution which is stable to dilute acids. The product is notable for its excellent softening properties in regard to textiles. It may be used as a textile softener in a neutral bath, particularly in the dyebath.

20 parts of the above sodium salt of the new acid are heated in an autoclave, whilst stirring with 20 parts of ethylene oxide, which is advantageously added in small portions, until all the ethylene oxide has been taken up, i. e. until the pressure has again fallen to normal.

The reaction product obtained is a viscous substance which is easily soluble in water and which is not precipitated from its solutions even by mineral acids.

Products with similar properties are obtained if a benzimidazol sulfonate prepared from hydrogenated whale oil fatty acids is used as parent material in the above process.

Example 3

77 parts of the sodium salt of the sulfonated benzimidazol obtained by condensation of o-phenylene diamine with coconut oil fatty acids and 26 parts of the ethyl ester of monochloracetic acid are introduced with stirring into 300 parts of absolute alcohol, and the mixture is boiled for 70 hours under reflux. The reaction mass is then diluted with its own volume of hot water, and dilute caustic soda solution is added to the aqueous-alcoholic solution until it continues to react alkaline to phenolphthalein. It is then heated for a short time and finally neutralised with dilute sulfuric acid.

After the solution has been filtered and evaporated in vacuo the sodium salt of the new acid, which presumably corresponds to the formula

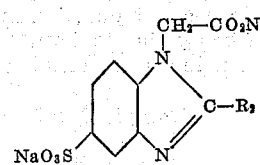

($R_2$=alkyl radicals which correspond to the fatty acids present in coconut oil), remains behind in the form of a light colored powder which is remarkable for the formation of exceptionally strongly foaming aqueous solutions, the foam of which is stable both in neutral and in weakly acid solutions.

The above reaction may be carried out in a similar manner in a benzene or toluene suspension instead of in absolute alcohol.

In the same way, the sodium salt of the sulfonated naphthimidazol obtained by condensation of 2:3-naphthylene diamine with coconut oil fatty acids, or the sodium salt of the N-dodecyl-$\mu$-propylbenzimidazol sulfonic acid or the potassium salt of $\mu$-amyl-benzimidazol sulfonic acid may be caused to react with the ethyl ester of monochloracetic acid and then treated with sodium hydroxide solution.

Example 4

77 parts of the sodium salt of the sulfonated benzimidazol obtained by condensation of o-phenylene diamine with coconut oil fatty acids and 26 parts of ethyl monochloracetate are introduced with stirring into 300 parts of benzene and the mixture is boiled under reflux for 70 hours. 22 parts of diethanolamine are now added to the thin-flowing reaction product, and heating is continued for a further 12 hours, after which the benzene is removed from the viscous reaction mass by distillation under reduced pressure. The dark colored, resinous residue is soluble in water but readily precipitated by a small addition of acid to the solution.

In order to obtain a product which is stable in acid solutions, the reaction product is taken up in warm water and, after addition of 25 parts of sodium hydroxide solution of 30% strength, is boiled for a short time. On evaporation, a light colored powder, probably of the formula

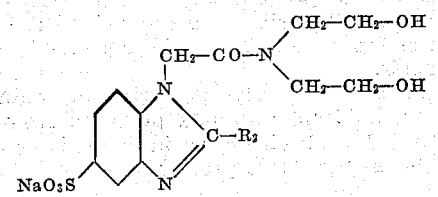

($R_2$=alkyl radicals which correspond to the fatty acids present in coconut oil), is obtained, solutions of which possess strong capillary activity.

A similar product is obtained if ethanol-ethylene diamine be used in place of diethanolamine in the second reaction of the above example.

Example 5

77 parts of the sodium salt of the sulfonated benzimidazol obtained from the condensation of o-phenylene diamine with coconut oil fatty acids and 26 parts of formaldehyde-$\gamma$-chloropropylene acetal are condensed in 300 parts of xylol, as described in Example 1, and worked up.

The first product obtained, which is difficultly soluble in water, is converted into a new compound by boiling for a short time with dilute alkali hydroxide solution. Aqueous solutions of this new product, the sodium salt of which probably has the formula

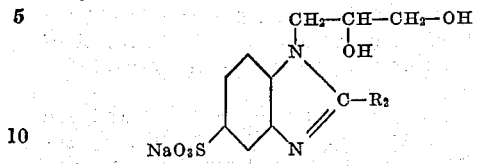

($R_2$=alkyl radicals which correspond to the fatty acids present in coconut oil), remain clear even after they have been made acid to litmus by addition of acids, and possess strong capillary-active properties.

Example 6

77 parts of the sodium salt of the sulfonated benzimidazol obtained by condensing o-phenylene diamine with coconut oil fatty acids, together with 33 parts of $\alpha$-chlorobutyric acid ethyl ester, are boiled for 24 hours in 500 parts of xylol. After the reaction is complete, the solvent is removed by distillation on the steam bath under reduced pressure.

The pulverized reaction product is stirred with water and is made definitely alkaline to phenolphthalein by addition of dilute sodium hydroxide solution at the boil, after which it is neutralized with dilute sulfuric acid. The solution thus obtained (or solutions of the light colored powder, which is obtained on evaporating this solution) is remarkable for its excellent wetting-out properties.

The new product probably possesses the formula

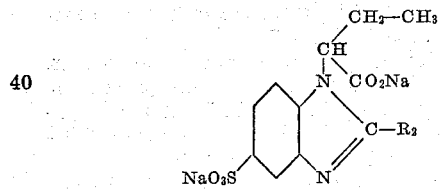

($R_2$=alkyl radicals which correspond to the fatty acids present in coconut oil.)

In a similar manner, an imidazol sulfonate which has been prepared by means of another fatty acid, for example, stearic acid may be used as parent material in place of the coconut oil fatty acid-benzimidazol sulfonate in carrying out the reaction. The $\alpha$-chlorobuturic acid ethyl ester may also be replaced by $\alpha$-chlorobutyric acid butyl ester.

Example 7

46 parts of the sodium salt of the sulfonated benzimidazol obtained by condensing o-phenylene diamine with technical stearic acid and 11 parts of glycerol-$\alpha$-monochlorohydrin are dissolved in 500 parts of xylol and the solution is boiled for 12 hours with stirring, after which the xylol is removed by distilling under reduced pressure, the reaction mass remaining as a viscous residue.

The product thus obtained is heated with 17.6 parts of ethylene oxide while stirring in an autoclave at 150–160° C. for 12 hours. In this way, a product is obtained which is almost insoluble in water, but which, after so much caustic soda has been added that the solution reacts definitely alkaline to phenolphthalein, dissolves to a clear solution on warming for a short time. The alkaline solution is then neutralized.

The resulting product is stable in weakly acid solutions and presumably possesses, in the form of the sodium salt, the formula

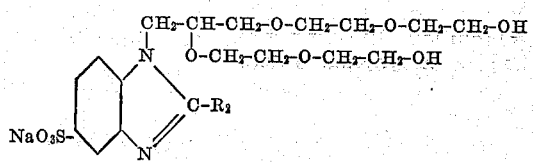

($R_2$=pentadecyl and heptadecyl radicals.)

A product having similar properties is obtained when the sodium salt of the sulfonated benzimidazol obtained by condensing o-phenylene diamine with hydrogenated whale oil fatty acids or the sodium salt of the sulfonated benzimidazol obtained by condensing o-phenylene diamine with arachidic acid is used as parent material.

The benzimidazol compound described above, derived from technical stearic acid and treated with glycerol-α-monochlorhydrin and, afterwards, with ethylene oxide, may find application as a textile auxiliary product in dyeing in the following manner:

A piece of ladies' wear material (10 parts by weight) containing viscose staple fibre effect threads, is well wetted out and is then dyed in a bath containing 0.4 part of Neolan Dark Green B (Schultz Farbstofftabellen, 7th edition, volume 3, page 149), 0.25 part of the product described above and 0.5 part of sulfuric acid per 500 parts by volume of dye liquor. The material is entered at 60° C., and the dyebath is heated in the course of ½ hour to the boil and dyeing is continued at the boil for a further 1½ hours. The dyeing obtained is considerably fuller and more bloomy than one obtained when working without the auxiliary product mentioned above. The reserve of the cellulose fibre is not influenced by the addition of the auxiliary product.

*Example 8*

46 parts of the sodium salt of the sulfonated benzimidazol obtained by condensing o-phenylene diamine with technical stearic acid and 11 parts of glycerol-α-monochlorhydrin are mixed well together and are heated with stirring for 12 hours in an autoclave at 130–140° C. The resulting product is now mixed with 17.6 parts of ethylene oxide and is heated for a further 12 hours in the autoclave at 150–160° C. It is then worked up as described in Example 7. A product is obtained which probably possesses the same formula as the product of Example 7, and which has similar properties.

The sulfonate of the benzimidazol obtained from hydrogenated whale oil fatty acids may be employed as parent material in the above example with similar success.

*Example 9*

46 parts of the sodium salt of the sulfonated benzimidazol obtained by condensing o-phenylene diamine with technical stearic acid, 11 parts of α-glycerol chlorhydrin and 16 parts of ethylene oxide are heated in a stirring autoclave for 12 hours at 150–160° C. The resulting product is heated with 12.6 parts of dimethyl sulfate whilst stirring for a further 3 hours at 100–110° C.

The product obtained is almost insoluble in water, but it dissolves on addition of a little caustic soda and is then stable to dilute acetic acid and mineral acid. The product thus obtained, which, in the form of its sodium salt, probably possesses the formula

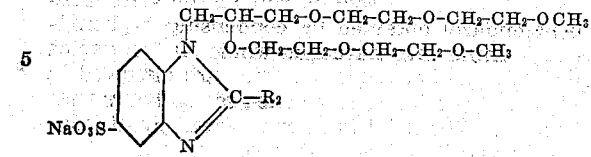

($R_2$=pentadecyl and heptadecyl radicals), may be used as a textile auxiliary product in the dyeing process as follows:

A dyebath is prepared as follows: 0.25 part of Neolan Violet 5R (Schultz, Farbstofftabellen, 7th edition, volume 3, page 154) 0.5 part of the product described above and 0.5 part of sulfuric acid 66° Bé. are dissolved in 500 parts by volume of water. 10 parts of wool yarn, previously well wetted-out, are entered into the dyebath, which is heated in the course of ½ hour to the boil, and dying is continued for a further 1½ hours at the boil. The resulting dyeing is very markedly deeper and more bloomy than one which has been prepared in similar circumstances but without the aid of the auxiliary product mentioned.

*Example 10*

46 parts of the sodium salt of the sulfonated benzimidazol obtained by condensing o-phenylene diamine with technical stearic acid are heated with 11 parts of α-glycerol chlorhydrin for 12 hours at 130–140° C. The product obtained is then heated with 154 parts of diethyl sulfate whilst stirring at 100–110° C. A product is obtained which is almost insoluble in water but which yields a clear solution when warmed for a short time in a solution made alkaline to phenolphthalein.

The new product corresponds in the form of its sodium salt probably to the formula

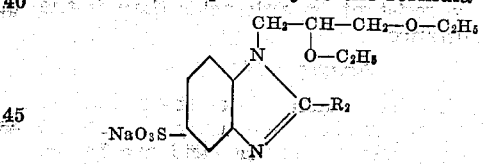

($R_2$=pentadecyl and heptadecyl radicals.)

*Example 11*

46 parts of the sodium salt of the sulfonated benzimidazol obtained by condensation of o-phenylene diamine with hardened whale oil fatty acids and 8 parts of ethylene chlorhydrin are dissolved in 500 parts of xylol and the solution is boiled for 12 hours with stirring, after which the xylol is removed by distillation under diminished pressure.

The product thus obtained is heated with 17.6 parts of ethylene oxide in the autoclave for 12 hours whilst stirring at 150–160° C. In this manner, a product is obtained which has similar properties to those of the product of Example 1. The sodium salt of the new product corresponds in all probability to the formula

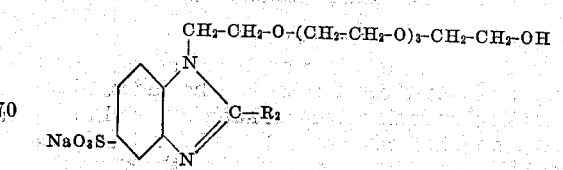

($R_2$=alkyl radicals which correspond to the fatty acids present in the hardened whale oil fatty acids.)

Example 12

46 parts of the sodium salt of the sulfonated benzimidazol obtained by condensing o-phenylene diamine with hardened whale oil fatty acids and 9.3 parts of chloracetamide are dissolved in xylol and the solution is boiled for 12 hours with stirring. The xylol is then removed by distillation under diminished pressure.

The product obtained is heated with 17.6 parts of ethylene oxide in the autoclave for 12 hours at 150–160° C., when a product is obtained which is soluble in alkalis and which is stable towards acetic acid.

The sodium salt of the new product probably corresponds to the formula

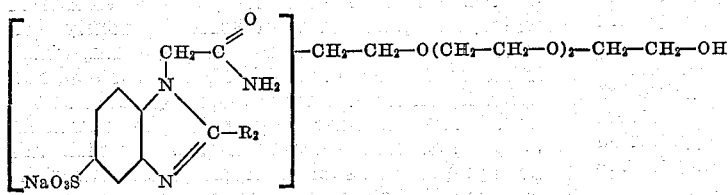

($R_2$=alkyl radicals which correspond to the fatty acids present in the hardened whale oil fatty acids; one hydrogen atom in the portion of the formula which is shown in brackets is replaced by the tetraethylene glycol radical.)

Example 13

46 parts of the sodium salt of the sulfonated benzimidazol obtained by the condensation of o-phenylene diamine with hardened whale oil fatty acids, 12.2 parts of formaldehyde-γ-chloropropylene acetal and 17.6 parts of ethylene oxide are heated in the autoclave with stirring for 12 hours at 150–160° C. A product is obtained which is directly soluble in water and which is also much more resistant towards acids than is the parent substance.

Example 14

46 parts of the sodium salt of the sulfonated benzimidazol obtained by condensing o-phenylene diamine with technical stearic acid are heated with 17.6 parts of ethylene oxide for 12 hours to 150–160° C. in the autoclave. The product thus obtained is heated for a further 3 hours at 100–110° C. with 12.6 parts of dimethyl sulfate. The resulting product is almost insoluble in water; it dissolves after warming for a short time in a solution which is alkaline to phenolphthalein and is then stable to acetic acid.

The sodium salt of the new product probably corresponds to the formula

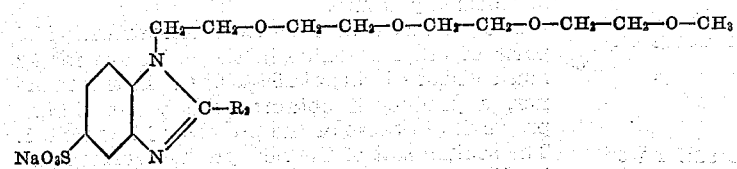

($R_2$=pentadecyl and heptadecyl radicals.)

Example 15

14.6 parts of ethylene oxide are added to 22.2 parts of the sodium salt of μ-heptadecyl-benzimidazol sulfonic acid in an autoclave whilst stirring, and the mixture is heated for 7½ hours to 140° C. After this time, the ethylene oxide has all been absorbed by the imidazol derivative, which is shown by the fact that the excess pressure in the autoclave has completely disappeared.

The reaction product is a pale brownish colored, half-solid mass, which becomes viscous on warming and which dissolves in water to a clear, neutral solution. In contrast to the parent substance, the product is stable to acid.

The product, which probably corresponds to the formula

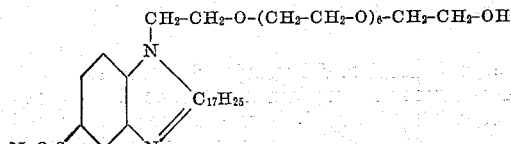

is an excellent washing agent.

In a similar manner the sodium salt of μ-undecyl-benzimidazol sulfonic acid may be used as parent material. 19.4 parts of the sodium salt of μ-undecyl-benzimidazol sulfonic acid are treated with 29.1 parts of ethylene oxide as described above. In this case also all the ethylene oxide being taken up. A product is obtained which reacts neutral and which is readily soluble in water, yielding solutions which possess pronounced capillary active properties.

Example 16

45 parts of the sodium salt of the sulfonated benzimidazol obtained by condensing o-phenylene diamine with technical stearic acid, 80 parts of benzene and 30 parts of glycide are heated in an autoclave for 6 hours at 75–80° C. with stirring. 36 parts of ethylene oxide are then added to the reaction mass, preferably in small portions, and the mixture is heated for a further 8 hours at 135–140° C. The benzene is removed by distillation as far as possible from the reaction product thus obtained, the residue is taken up in hot water (if desired, remaining traces of benzene may be removed by steam distillation) and the solution is evaporated to dryness. The reaction product is a brown colored mass, viscous when heated, solidifying to a resinous product on cooling. Its aqueous solution possesses excellent levelling properties, particularly when used as an auxiliary product in the dyeing of wool with acid dyestuffs. It is also equally suitable for use as an auxiliary product in the washing of wool in acid baths, as well as in the presence of salts.

The manufacture of the product by the above process may be varied in many ways. Thus, other inert solvents, such as xylene, toluene, etc., may be used in condensing the sulfonated benzimidazol with the oxides, or the condensation may take place in the absence of any solvent whatever—but this requires special apparatus on account of the difficulty experienced in stirring the reaction mass. In a similar manner, the quantities of glycide and ethylene oxide used and the temperature of reaction may be varied extensively. For example, only 4 mols of ethylene oxide may be allowed to react with every mol of the benzimidazol sulfonate.

In a similar manner, the salts of other sulfonated benzimidazols may be used in the reaction, for example, the benzimidazols obtained from o-phenylene diamine and hydrogenated whale oil fatty acids, coconut oil fatty acids, etc.

Example 17

89 parts of μ-heptadecyl-benzimidazol sodium sulfonate are heated with 74 parts of epichlorhydrin for 4 hours at 110–115° C. As the reaction commences, the reaction mixture starts to heat up, and the reaction temperature must be maintained by outside cooling of the reaction vessel. After the period mentioned has elapsed, the epichlorhydrin in excess is removed by distilling under diminished pressure, and the residue (125 parts) is ground up after cooling. The powder thus obtained is suspended in 100 parts by volume of water and caustic soda solution is added at the boil until the solution is definitely alkaline to phenolphthalein. The solution, which is now clear, is neutralised with dilute sulfuric acid and is evaporated to dryness.

The light colored residue is heated in an autoclave with 75 parts of ethylene oxide at 135–140° C. with stirring until the excess pressure has completely disappeared. The product obtained cools to form a brownish, solid resin. It is easily soluble in water and is not precipitated by dilute mineral acid. It is suitable for use as a levelling agent in wool dyeing and as a wool washing agent in acid baths.

What we claim is:

1. A process for the manufacture of imidazole derivatives, which comprises heating in the absence of water an alkylating agent which introduces an alkyl substituted by at least one hydroxy group with aryl imidazole derivatives of the general formula

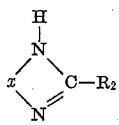

wherein $x$ stands for a radical of the benzene series containing a neutralized sulfonic acid group, and $R_2$ stands for an alkyl containing an odd number of carbon atoms between 10 and 20, and heating the products thus obtained with an alkalating agent which differs from the alkylating agent first employed and contains a 1:2-epoxy group.

2. A process for the manufacture of imidazole derivatives, which comprises heating in the absence of water glycidol with aryl imidazole derivatives of the general formula

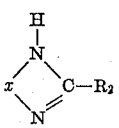

wherein $x$ stands for a radical of the benzene series containing a neutralized sulfonic acid group and $R_2$ stands for an alkyl containing an odd number of carbon atoms between 10 and 20, and heating the products thus obtained with ethylene oxide.

3. A process for the manufacture of an imidazole derivative, which comprises heating in the absence of water 4 mols of glycidol with 1 mol of an imidazole derivative mixture of the general formula

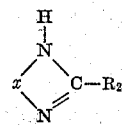

wherein $x$ stands for a radical of the benzene series containing a neutralized sulfonic acid group, and $R_2$ stands for the pentadecyl- and heptadecyl-radical, and heating the product thus obtained with 8 mols of ethylene oxide.

4. A process for the manufacture of an imidazole derivative, which comprises heating in the absence of water 1 mol of glycerol α-chlorohydrin with 1 mol of an imidazole derivative of the formula

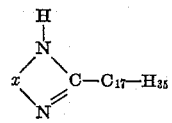

wherein $x$ stands for a radical of the benzene series containing a neutralized sulfonic acid group, heating the product thus obtained with 4 mols of ethylene oxide, and treating the product of the last named reaction with a solution of an alkali hydroxide.

5. The products obtained by the process which comprises heating an alkylating agent which introduces an alkyl containing at least 2 hydroxy groups in the absence of water with aryl imidazole derivatives of the general formula

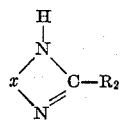

wherein $x$ stands for a radical of the benzene series containing a neutralized sulfonic acid group, $R_2$ stands for an alkyl containing an odd number of carbon atoms between 10 and 20, and heating the products thus obtained with an alkylating agent which differs from the alkylating agent first employed and contains an 1:2-epoxy group which products in the form of the alkali salts of the corresponding sulfonic acids are viscous to solid substances soluble in water to form solutions which are strong capillary active.

6. The products obtained by the process which comprises heating glycidol in the absence of water with aryl imidazole derivatives of the general formula

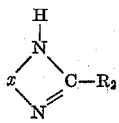

wherein $x$ stands for a radical of the benzene series containing a neutralized sulfonic acid group and $R_2$ stands for an alkyl containing an odd number of carbon atoms between 10 and 20, and heating the products thus obtained with ethylene oxide, which products in the form of the alkali salts of the corresponding sulfonic acids are viscous to solid substances soluble in water to form solutions which are strong capillary active.

7. The product obtained by the process which comprises heating 4 mols of glycidol in the absence of water with an imidazole derivative mixture of the formula

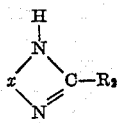

wherein $x$ stands for a radical of the benzene series containing a neutralized sulfonic acid group and $R_2$ stands for the pentadecyl- and heptadecyl radical, and heating the product thus obtained with 8 mols of ethylene oxide, which product after drying is a solid substance soluble in water to form solutions which are strong capillary active.

8. The product obtained by the process which comprises heating in the absence of water 1 mol of glycerol-α-chlorhydrin with 1 mol of an imidazole derivative of the formula

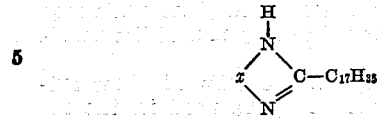

wherein $x$ stands for a radical of the benzene series containing a neutralized sulfonic acid group, and heating the product thus obtained with 4 mols of ethylene oxide, and treating the product of the last named reaction with a solution of an alkali hydroxide which product after drying is a solid substance soluble in water to form solutions which are strong capillary active.

CHARLES GRAENACHER.
PAUL STREULI.
JOST FREI.